Feb. 7, 1933.  V. J. BUTTERFIELD  1,896,068
HEATING SYSTEM FOR AUTOMOTIVE VEHICLES
Filed Nov. 12, 1928  3 Sheets-Sheet 2
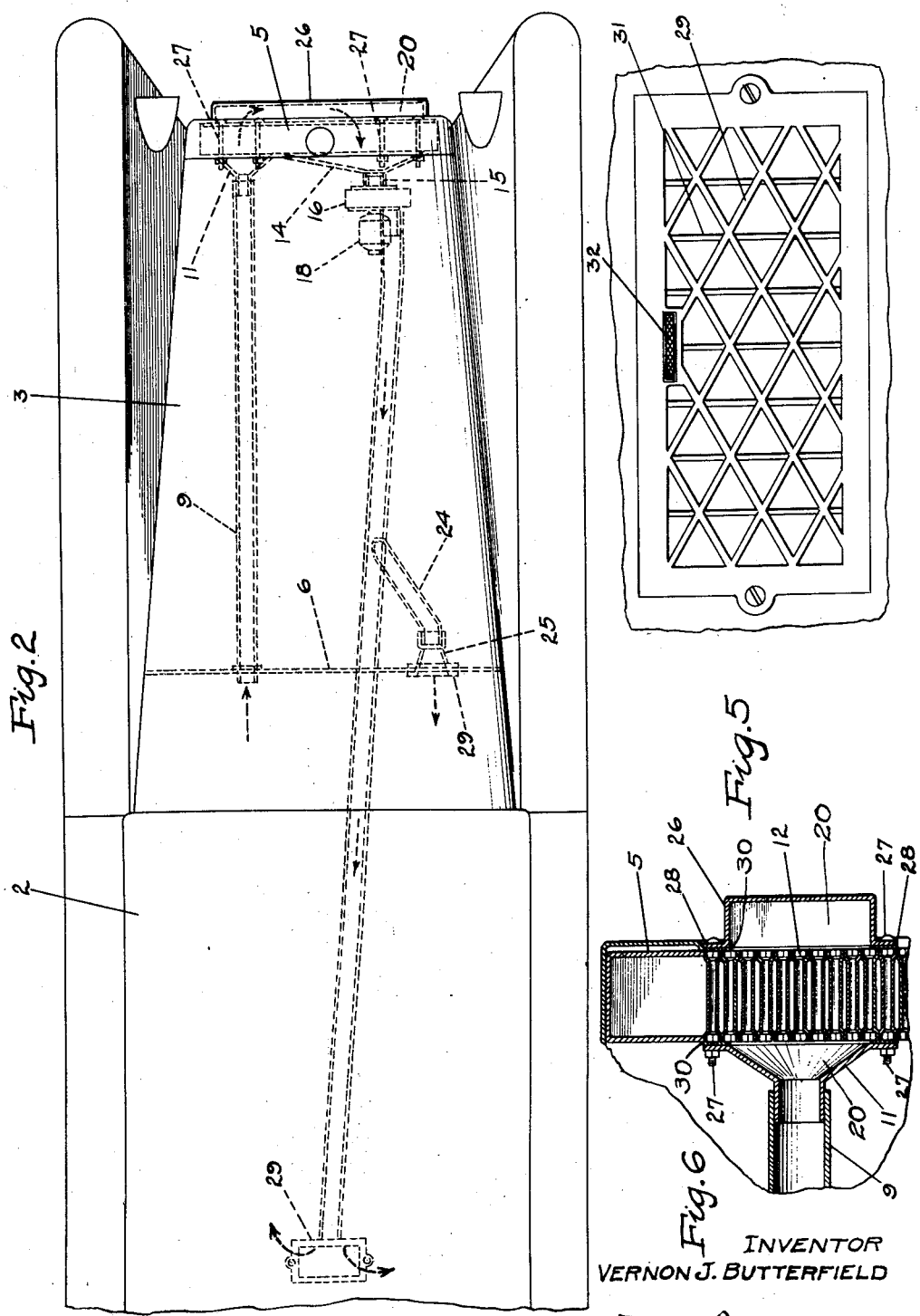
INVENTOR
VERNON J. BUTTERFIELD
ATTORNEYS

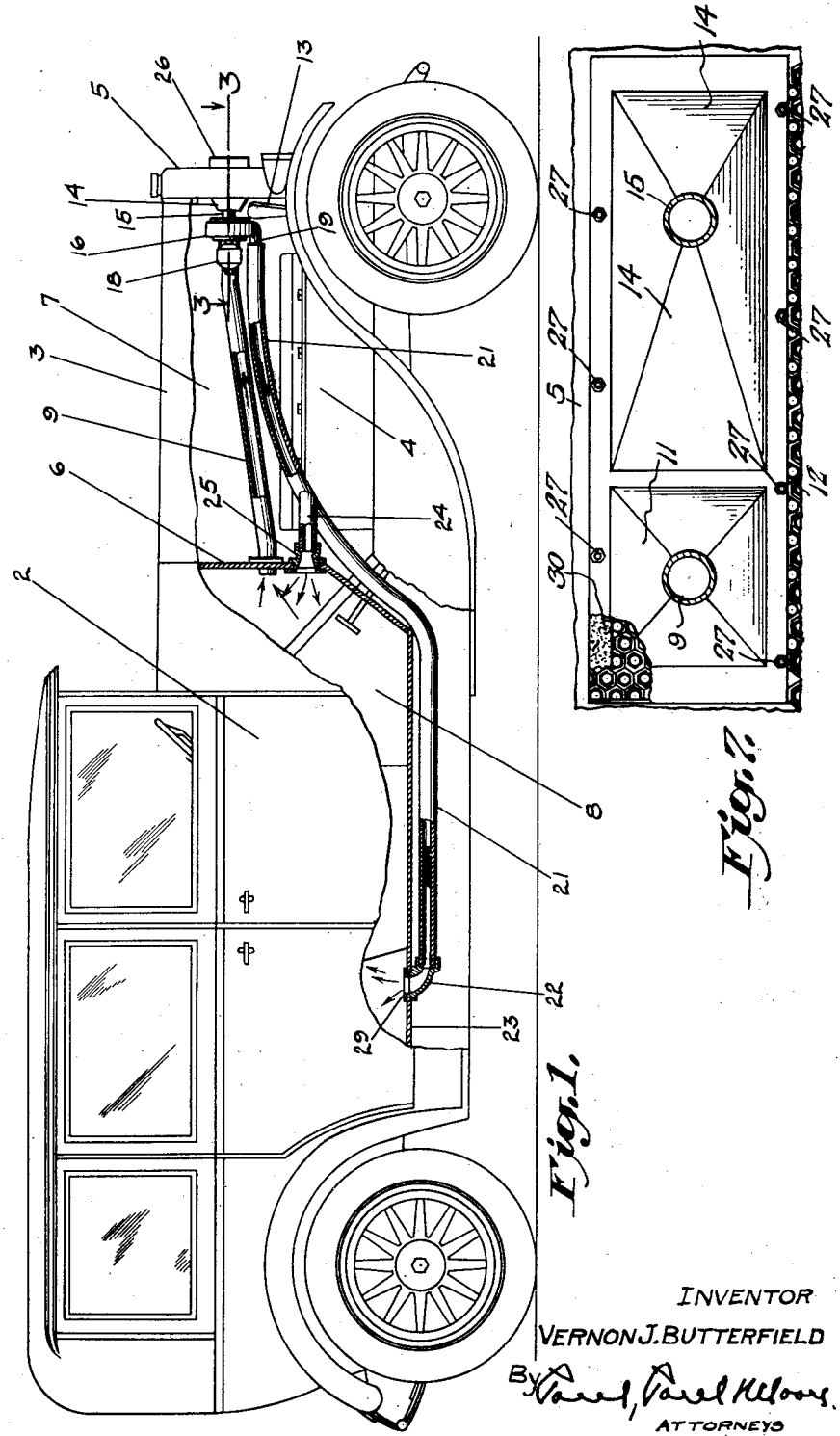

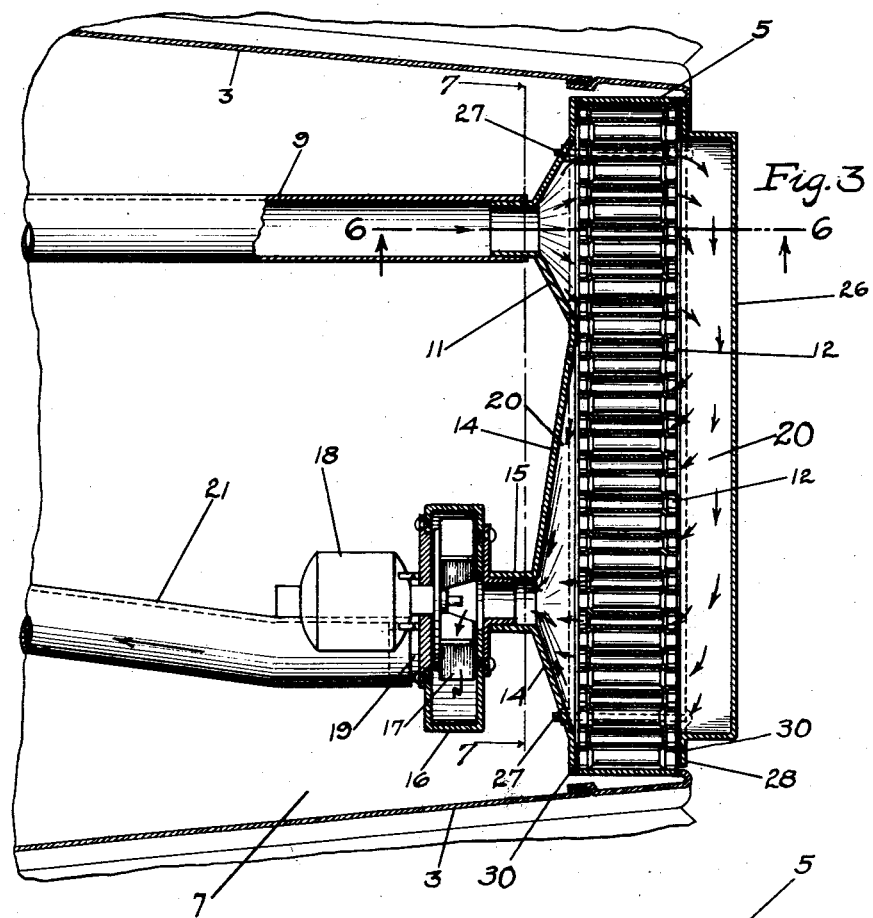
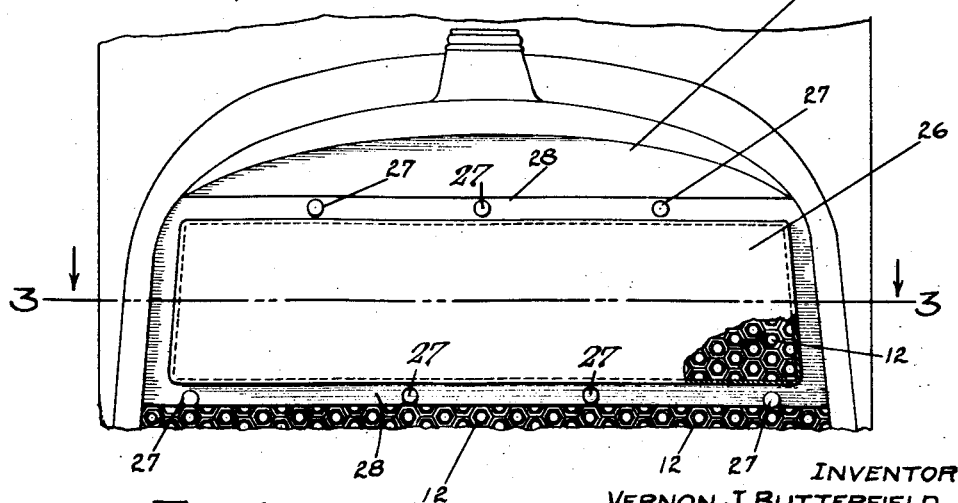

Patented Feb. 7, 1933

1,896,068

UNITED STATES PATENT OFFICE

VERNON J. BUTTERFIELD, OF MINNEAPOLIS, MINNESOTA, ASSIGNOR TO TROPIC-AIRE, INCORPORATED, OF MINNEAPOLIS, MINNESOTA, A CORPORATION OF DELAWARE

HEATING SYSTEM FOR AUTOMOTIVE VEHICLES

Application filed November 12, 1928. Serial No. 318,762.

This invention relates to an improved heating system for motor-driven vehicles, and an object of the invention is to provide such a heating system making use of the usual water-cooling radiator in the engine cooling system, for heating the air within the vehicle body. The apparatus comprises a conduit having one end connected with the interior of the vehicle and its other end connected with the air passageways traversing the upper portion of the radiator, and a suitable suction fan having its intake connected with said passageways and having its discharge connected with the interior of the vehicle, whereby the air within the vehicle body is circulated through a portion of said radiator and heated, and thereafter returned to the interior of the vehicle, thereby heating and circulating the air within the vehicle body.

The particular object of the invention therefore is to provide a simple hot air heating system for automotive vehicles comprising a fan adapted to circulate the air within the vehicle body through a portion of the usual water-cooling radiator of the engine, and to return the same to the interior of the vehicle body.

Other objects of the invention will appear from the following description and accompanying drawings and will be pointed out in the annexed claims.

In the accompanying drawings, there has been disclosed a structure designed to carry out the various objects of the invention, but it is to be understood that the invention is not confined to the exact features shown as various changes may be made within the scope of the claims which follow.

In the accompanying drawings forming part of this specification;

Figure 1 is a side elevation of an automotive vehicle, partially broken away to show the invention applied thereto;

Figure 2 is a plan view of a portion of Figure 1;

Figure 3 is a sectional plan view on the lines 3—3 of Figures 1 and 4;

Figure 4 is a front elevation of the upper portion of the engine cooling radiator;

Figure 5 is an enlarged detailed view showing the means provided for controlling the flow of heated air to the interior of the vehicle body;

Figure 6 is a detailed sectional view on the line 6—6 of Figure 3; and

Figure 7 is a detailed sectional view on the line 7—7 of Figure 3.

In the selected embodiment of the invention here shown, for purposes of disclosure, there is illustrated in Figure 1, an automotive vehicle of the sedan type, including the usual body 2, engine hood 3, engine 4, radiator 5, connected with the engine in the usual manner, and the dash 6 separating the engine chamber 7 from the interior 8 of the vehicle.

The novel heating system featured in this invention comprises a conduit 9 having one end supported preferably in the dash 6 and communicating with the interior 8 of the vehicle body. The opposite end of the conduit 9 is secured to an outwardly flared member 11, secured to the inner upper portion of the radiator 5 as shown in Figure 3. The form of radiator here shown comprises a plurality of air-circulating tubes or passageways 12, through which air is drawn into the engine chamber 7 by means of the usual motor fan 13, indicated in Figure 1. The member 11, to which the conduit 9 is connected, is secured to the upper portion of the radiator 5, as shown in Figures 1, 3, and 6.

A second member 14 is also secured to the inner side of the radiator 5, preferably in horizontal alinement with the member 11, and has a neck 15, to which a fan housing 16 is secured. A suitable suction fan 17 is mounted within the housing 16 and is adapted to be driven by a suitable motor 18, which may be either electric or fluid-operated. The housing 16 has a discharge 19 to which one end of a pipe 21 is connected. The opposite end of this pipe is connected to a fitting 22, mounted in the floor 23 of the vehicle so that the hot air discharged from the housing 16 by the fan 17, may be delivered into the interior of the vehicle, as indicated by the arrows in Figures 1 and 2. A branch 24 leads from the pipe 21 to a fitting 25, preferably mounted in the dash 6 of the vehicle. Thus, it will be seen that when the fan 17 is operated, heated air will be delivered to the fittings 22 and 25 and into the vehicle body.

A suitable casing 26 is mounted exteriorly of the radiator 5 in alinement with the members 11 and 14. This casing is secured to the radiator by suitable bolts 27, which bolts also secure the members 11 and 14 to the radiator, as shown in Figures 3 and 6. The members 11 and 14, casing 26, and the air passageways 12 in the upper portion of the radiator cooperate to define an air-heating chamber 20. The casing 26 has an annular flange 28 adapted to be fitted against the front surface of the radiator to provide a closure for the air passageways or tubes 12, provided in the upper portion of the radiator. The members 11 and 14, and casing 26, when mounted upon the radiator as above described, provide a closure for the air passageways or tubes 12 situated in the upper portion of the radiator, so that when the suction fan 17 is operated, air will be drawn from the interior of the vehicle body through the conduit 9, member 11, and through the air-circulating tubes or passageways 12, in direct communication with the conduit 9; then through the casing 26 and into the member 14, through the fan housing 16 and pipe 21, and returned to the interior 8 of the vehicle body, through the fittings 25 and 22, as clearly indicated by the arrows in Figures 1, 2, and 3. Suitable gaskets 30 are interposed between the radiator 5 and the flanges of the members 11 and 14, and casing 26, to provide substantially leak-proof joints therebetween.

The fittings 22 and 25 are provided with suitable grids 29, each having a suitable shutter 31, operable by means of a knurled segment 32. The shutters 31 and members 32 may be of ordinary construction, such as are commonly used in floor registers, and it is therefore thought unnecessary to show same in detail.

The novel heating system featured in this invention is not directly connected with the engine cooling medium circulating system but, as hereinbefore stated, heats the air within the vehicle body by circulating it through a portion of the vehicle engine radiator. The members 11 and 14 positively prevent obnoxious gases, within the engine chamber 7, from being circulated through the interior of the vehicle body, and, in like manner, the casing 26 prevents foul and dust laden air from being drawn into the vehicle body from the exterior thereof.

The apparatus is very simple and may be installed in the vehicle in a comparatively short period of time. In the drawings, I have shown a suction fan for circulating the air from the interior of the vehicle through the upper portion of the radiator 5, but it is to be understood that any suitable fan or means may be employed which will circulate the air through the conduits 9, radiator 5, pipe 21, and vehicle body, as described in this application. The motor 18 may also be operated from the usual electric source provided in the vehicle.

I claim as my invention:

1. A heating system for motor-driven vehicles including an engine cooling system having an inter-communicating jacket and radiator for a circulating cooling medium, said radiator having air passageways therethrough, comprising conduits connecting the interior of the vehicle body with said air passageways and providing therewith a closed channel separated from said cooling medium jacket, and means for withdrawing air from the vehicle body interior, forcing said withdrawn air through said conduits and air passageways, and returning said air to the interior of said vehicle body.

2. A heating system for motor-driven vehicles including an engine cooling system having an inter-communicating jacket and radiator for a circulating cooling medium, said radiator having air passageways therethrough, comprising means connecting the interior of a vehicle body with said air passageways and providing an air channel separated from said cooling medium jacket and from the outside atmosphere, and a fan for withdrawing air from the vehicle body interior and forcing said withdrawn air through said air passageways and to the interior of said vehicle body.

3. A heating system for motor-driven vehicles including an engine cooling system having an inter-communicating jacket and radiator for a circulating cooling medium, said radiator having air passageways therethrough, comprising means secured to said radiator and cooperating with a plurality of said air passageways to form an air heating chamber, means connecting the interior of the vehicle body with said air heating chamber and providing a channel separated from said cooling medium jacket and from the outside atmosphere, and means for withdrawing air from the vehicle body interior and forcing said withdrawn air through said air heating chamber and to the interior of said vehicle body.

4. A heating system for motor-driven vehicles including an engine cooling system having an inter-communicating jacket and radiator for a circulating cooling medium, comprising a unit including an air conduit leading from the vehicle body, passing through said radiator and returning to said vehicle body, said air conduit being closed to the atmosphere except by way of the vehicle body, and means for withdrawing air from the vehicle body and forcing said withdrawn air through said air conduit and to the interior of the vehicle body.

5. A heating system for motor-driven vehicles including an engine cooling system having an inter-communicating jacket and radiator for a circulating cooling medium, said radiator having air passageways therethrough, comprising means secured to said radiator and cooperating with certain of said air passageways to provide an air heating chamber, means connecting the interior of the vehicle with said air heating chamber and providing therewith a channel closed to the atmosphere, and means for withdrawing air from the vehicle body interior and forcing said withdrawn air through said air heating chamber and to the interior of said vehicle body.

In witness whereof, I have hereunto set my hand this 20 day of Oct. 1928.

VERNON J. BUTTERFIELD.